UNITED STATES PATENT OFFICE.

ARTHUR LOWENSTEIN, OF CHICAGO, ILLINOIS.

HYDROGENATED-OIL FOOD PRODUCT.

1,187,999.  Specification of Letters Patent.  Patented June 20, 1916.

No Drawing.  Application filed August 31, 1915. Serial No. 48,167.

*To all whom it may concern:*

Be it known that I, ARTHUR LOWENSTEIN, a citizen of the United States, residing at Chicago, in the county of Cook and State of Illinois, have invented a new and useful Improvement in Hydrogenated-Oil Food Products, of which the following is a specification.

My invention relates to a certain new and useful product of the class of fatty oils or oil-like substances and to a method of producing the same. My new product is made from a fatty oil, preferably cotton-seed or other vegetable oil, by partially hydrogenating the same until its least stable constituents, or non-glyceridic substances, have been altered or destroyed.

The object of my invention is to provide a new and useful substance of this kind suitable for use as a salad oil, cooking oil or for such other purposes as cotton-seed oil, or similar oils have heretofore been used, my new product being markedly superior to such previous products in keeping qualities.

A further advantage of the new product lies in the fact that the dissolved stearin therein is found to crystallize most readily, which quality renders the product especially suitable for winter or cold pressing for salad oil.

Accompanying cotton-seed oil or other fatty oils, notably seed oils, are always certain impurities. According to Lewkowitsch (*Technology of Oils and Fats*) "these can be removed for the most part by steaming or washing with water, followed by bleaching or filtering, but even after this purification small quantities of non-glyceridic substances remain dissolved. Some of these must be regarded as entirely foreign substances, *e. g.* traces of coloring matter, chromo genetic substances (producing the color reactions which are characteristic of some oils and fats)." While refined choice or prime yellow cotton-seed oil keeps very well in dry storage, bleached or bleached and deodorized cotton-seed oil (produced by steaming) does not keep so well under similar storage conditions but tends to become rancid very much more quickly than the refined undeodorized yellow oil. Cotton-seed oil partially hydrogenized, as described hereafter, does not exhibit this tendency toward rancidity even though bleached oil is employed. Nor does the hydrogenated oil, if subsequently deodorized, develop this tendency. In other words, hydrogenation as carried out in the manufacture of my new product appears to have so altered or destroyed the non-glyceridic substances present that the new oil has been markedly improved as to its keeping qualities. That there has been such a change in the quantity or character of the non-glyceridic substances is evidenced by the fact that my new product does not respond to the Halphen test, which is characteristic of cotton-seed oil.

In carrying out my new process for the manufacture of the product, a fatty oil, for instance choice or prime yellow cotton-seed oil, is placed in a closed vessel and caused to be chemically combined with hydrogen in the presence of a catalyzer. Any of the known processes of hydrogenation, or any active catalyzer may be employed, which does not leave any residual catalytic impurities in the product after careful filtration. A temperature of 150° to 200° centigrade has been satisfactorily employed and the time required to produce the desired result after attaining this temperature is from five to thirty minutes, depending upon the activity and proportion of the catalyzer employed. In practice the time or degree of hydrogenation desired are determined by a preliminary experiment on the oil and catalyzer used in an experimental apparatus. In carrying on such preliminary test the hydrogenation process is continued until a sample of the oil fails to respond to the Halphen reaction and the desired degree of crystallization takes place when the oil is chilled.

Depending upon the particular cotton-seed oil treated by the process the iodin value of the finished product varies from about 90 to 102. Its titre (as determined by the Wolfbauer method) has been slightly increased during the process to the extent of from about $\frac{1}{10}$° C. to $\frac{5}{10}$° C. over that of the original oil treated. The color of the treated product is usually somewhat lighter than the original oil. On cooling the product it in part readily crystallizes, thereby making the separation of stearin from the oil much easier and more effective for "winter pressing" for salad oil than is the case with ordinary cotton-seed oil. The new product responds negatively to the Milliau test for cotton-seed oil.

It is of course well known that by simply heating cotton-seed oil to 250° C. and maintaining it at this temperature for a sufficient length of time a product will be produced which no longer responds to the Halphen test. Such heating however produces an oil of offensive taste and odor, of appreciably darkened color and having a pronounced tendency to turn rancid. Furthermore, such heating does not alter the titre or iodin number of the oil and does not affect appreciably its tendency to separate the stearin on chilling. Furthermore, such heated oil even though it fails to respond to the Halphen test still responds to Milliau's test for cotton-seed oil. My new product in addition to its other distinctive characteristics does not respond to the Milliau test.

From the foregoing it will be understood that I have produced a new fatty oil of the general character of the original oil and intended for the same uses as the latter, but which is readily distinguishable from the untreated product both by physical and chemical tests and which is notably superior thereto in two respects, i. e., as to its keeping qualities and as to the facility with which its stearin may be separated.

I am aware that various kinds of oils have been treated by hydrogenation processes for the purpose of producing new products, but such new products so far as I am aware have always heretofore been either of the class of lard-like or butter-like compositions or even more fully hardened. My new product on the other hand is essentially an oil or an oil-like substance and cannot be said to have been appreciably hardened by the hydrogenation process. On the other hand the hydrogenation as carried out and limited to the extent practised in producing my new product appears to have exerted its principal effect but rather upon the relatively small remaining portion.

In the foregoing specification I have particularly and in considerable detail, described a preferred form of my new product and the manner in which the same may be produced. It is to be understood however that this description is only for the purpose of making my invention more clear and that I do not regard the same as limited in scope to the particularities disclosed, except in so far as I have included such limitations within the terms of the following claims, in which it is my intention to claim all novelty inherent in my invention as broadly as is possible in view of the prior art.

What I claim as new and desire to secure by Letters Patent is:—

1. An edible oil of the general character of cotton-seed oil but which fails to respond to the Halphen and Milliau reactions.

2. An edible oil of the general character of cotton-seed oil and having an iodin number of from about 90 to 102 and further characterized by the fact that it responds negatively to the Halphen and Milliau tests for cotton-seed oil.

3. A cotton-seed oil in which the non-glyceridic substances have been so altered that the oil fails to respond to the Halphen and Milliau tests for cotton-seed oil.

4. An edible oil produced by hydrogenating cotton-seed oil until it fails to respond to the Halphen reaction, the hydrogenation process being stopped at this point and before the titre of the oil has been substantially increased.

5. A fatty oil modified by hydrogenating to an extent only sufficient to raise the titre from $\frac{1}{10}$ to $\frac{5}{10}°$ C., and characterized by the fact that its glyceridic portion is substantially unchanged and that the remaining portion is materially altered.

6. A vegetable fatty oil modified by hydrogenating to an extent only sufficient to raise the titre from $\frac{1}{10}$ to $\frac{5}{10}°$ C., and characterized by the fact that its glyceridic portion is substantially unchanged and that the remaining portion is materially altered.

7. The herein described process which consists in hydrogenating a fatty oil by a catalytic hydrogenation process until the titre of the oil has been raised from $\frac{1}{10}$ to $\frac{5}{10}°$ C. and arresting the hydrogenation process at that point, whereby the glyceridic substances of the oil are substantially unchanged and the remaining fraction is materially altered.

8. The herein described process which consists in hydrogenating a vegetable oil by a catalytic hydrogenation process until the titre of the oil has been raised from $\frac{1}{10}$ to $\frac{5}{10}°$ C. and arresting the hydrogenation process at that point, whereby the glyceridic substances of the oil are substantially unchanged and the remaining fraction is materially altered.

9. The herein described process which consists in hydrogenating cotton-seed oil until it fails to respond to the Halphen reaction, the hydrogenation process being arrested before the titre of the oil has been substantially increased.

10. The herein described process which consists in hydrogenating cotton-seed oil by a catalytic hydrogenation process, until the oil treated fails to respond to the Halphen reaction, the process being arrested when the titre of the oil has been increased to the extent of from about $\frac{1}{10}°$ C. to $\frac{5}{10}°$ C.

ARTHUR LOWENSTEIN.

Witnesses:
L. HEISLAR,
L. V. HIGGINS.